Aug. 15, 1933.  H. L. WIDNER  1,922,997
COMBINATION LEVEL AND GAUGE
Filed May 15, 1931
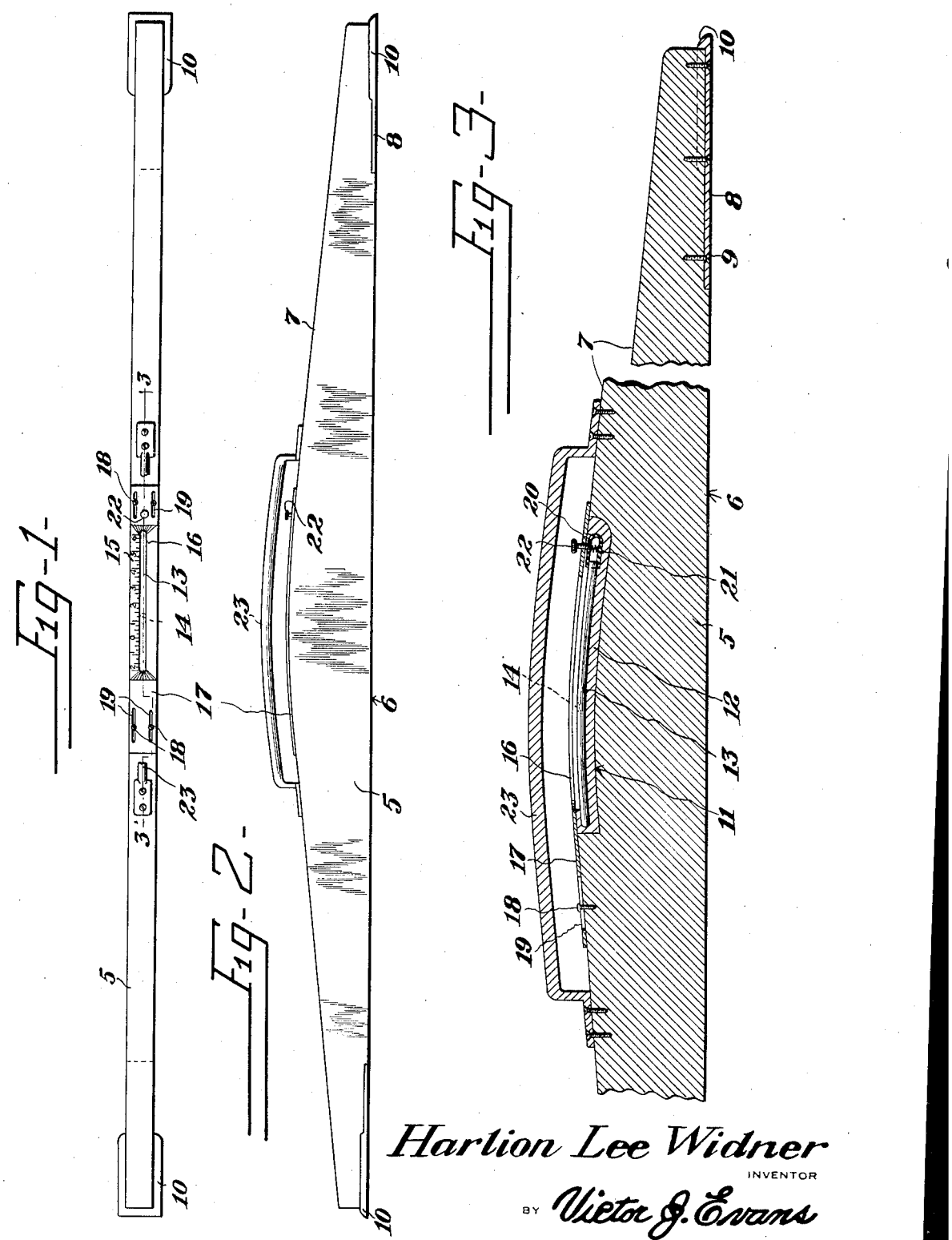
Harlion Lee Widner
INVENTOR
BY Victor J. Evans and Co.
ATTORNEY Patented Aug. 15, 1933

1,922,997

UNITED STATES PATENT OFFICE 1,922,997

COMBINATION LEVEL AND GAUGE

Harlion Lee Widner, Fayetteville, Tenn.

Application May 15, 1931. Serial No. 537,674

1 Claim. (Cl. 33—212)

The invention relates to a railroad rail level and more particularly to a combination level and gauge for railway track use.

The primary object of the invention is the provision of an instrument of this character wherein the level of opposite rails of a track can be determined with dispatch and also the excess in elevation of one rail with respect to the other.

Another object of the invention is the provision of an instrument of this character, wherein the air bubble in the liquid leveling tube can be regulated so as to have the instrument accurate for determining the level of the rails of a track with respect to each other.

A further object of the invention is the provision of an instrument of this character which is simple in construction, readily portable, thoroughly reliable and efficient in its purposes, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:—

Figure 1 is a top plan view of a level and gauge constructed in accordance with the invention.

Figure 2 is a side elevation thereof.

Figure 3 is an enlarged fragmentary vertical longitudinal sectional view.

Similar reference characters indicate corresponding parts throughout the several views in the drawing.

Referring to the drawing in detail, the instrument comprises a beam 5, preferably made from wood, although it may be made from any other suitable material, wood being preferable by reason of the fact that it renders the instrument light in weight. This beam has a straight bottom edge 6 and an arched top edge or face 7, while counter sunk within the straight bottom edge 6 of said beam at opposite end portions thereof are bearing tips or plates 8. Each tip or plate is preferably secured by screw fasteners 9 which are passed therethrough and engage in the beam. The outer end portions of these plates both at opposite sides and the extreme ends thereof are shouldered or rimmed at 10 to protect and guard the ends of the beam 5 as will be clearly apparent.

Located medially of the beam 5 at the longitudinal center thereof is a depression 11 opening through the top edge or face 7 and in which is introduced a plaster of Paris foundation or bed 12 having set therein a leveling tube or column 13, which is outwardly arched uniformly to the arc of a circle with a radius of fifty-six and one-half inches. The tube or column 13 is set in the beam 5 to have one end at a lower level than the other when the beam is at rest in a true horizontal position. The upper side or surface of said tube 13 is visible at the top edge 7 of the beam 5 for the reading of the liquid contents therein having the air bubble 14 which coacts with a scale 15 impressed or otherwise formed longitudinally at one side of a sight opening or slot 16 in a scale plate 17. In the preferred embodiment as shown a scale plate 17 is adjustably secured upon the arched top edge 7 of the beam 5 through the medium of set screws 18 engaged in elongated slots 19 formed in said plate 17.

The scale 15 is calibrated to indicate variations of one-quarter inch in the elevations of the respective ends of the beam. These graduations of superelevation extend from zero near one end of the scale, to six inches adjacent to the other end, the zero mark of the scale being located adjacent the point of the level vial, that is highest relative to the plane of the bottom edge. The scale also extends in the opposite direction from the zero point for a short distance, to be used in the obvious manner.

The tube 13 is closed at one end by drawing the same together at this end, while the other end of said tube has fitted thereon a rubber sack or cup 20 in which is fitted a coiled expansion spring 21 which latter serves to prevent the collapsing of the sack or cup. Working against the sack or cup 20 in alignment with the spring 21 therein is a finger operated screw 22 which serves to permit of adjustment of said sack or cup to lengthen the bubble 14 in the contents of the tube 13. The lengthening of the bubble 14 in the tube or column 13 enables a more convenient reading of the elevating tube or column as the location of the bubble with respect to the scale 15 can be more readily ascertained.

Mounted on the top edge 7 of the beam 5 in bridging relation to the tube 14 is a handle bar 23 whereby the instrument can be readily carried in the hand of a user and transported from one location to another as will be obvious.

The beam 5 serves as a gauge bar for gauging the spacing of the rails of a track from each other. To gauge the distance apart of the rails of a track the instrument is placed upon the opposite rails of such track so that the outer edges of the balls of the rails will be flush with the outer extremities of the tips or plates 8, the distance between these points being the standard gauge for the spacing of the track rails.

In the use of the beam 5 the plates 8 are brought to rest upon the treads of the rails of the track opposite each other and on the reading of the scale 15 in conjunction with the bubble 14 it can be readily ascertain the extent of variance in the level of these rails with respect to each other.

What is claimed is:—

In an instrument of the character described, a beam having a straight lower edge, a spirit level carried in the beam and exposed through its upper edge thereof and arranged with one end lower than the other, a scale adjacent to said level and calibrated for reading of superelevation of six inches at one end and a reading of zero superelevation or horizontal near the other end thereof, a compressible bulb communicating with one end of the level and adapted when compressed to shorten an air bubble in the level, and a finger operated screw mounted in the beam and active upon the bulb for compressing the same.

HARLION LEE WIDNER.